Patented Nov. 1, 1932

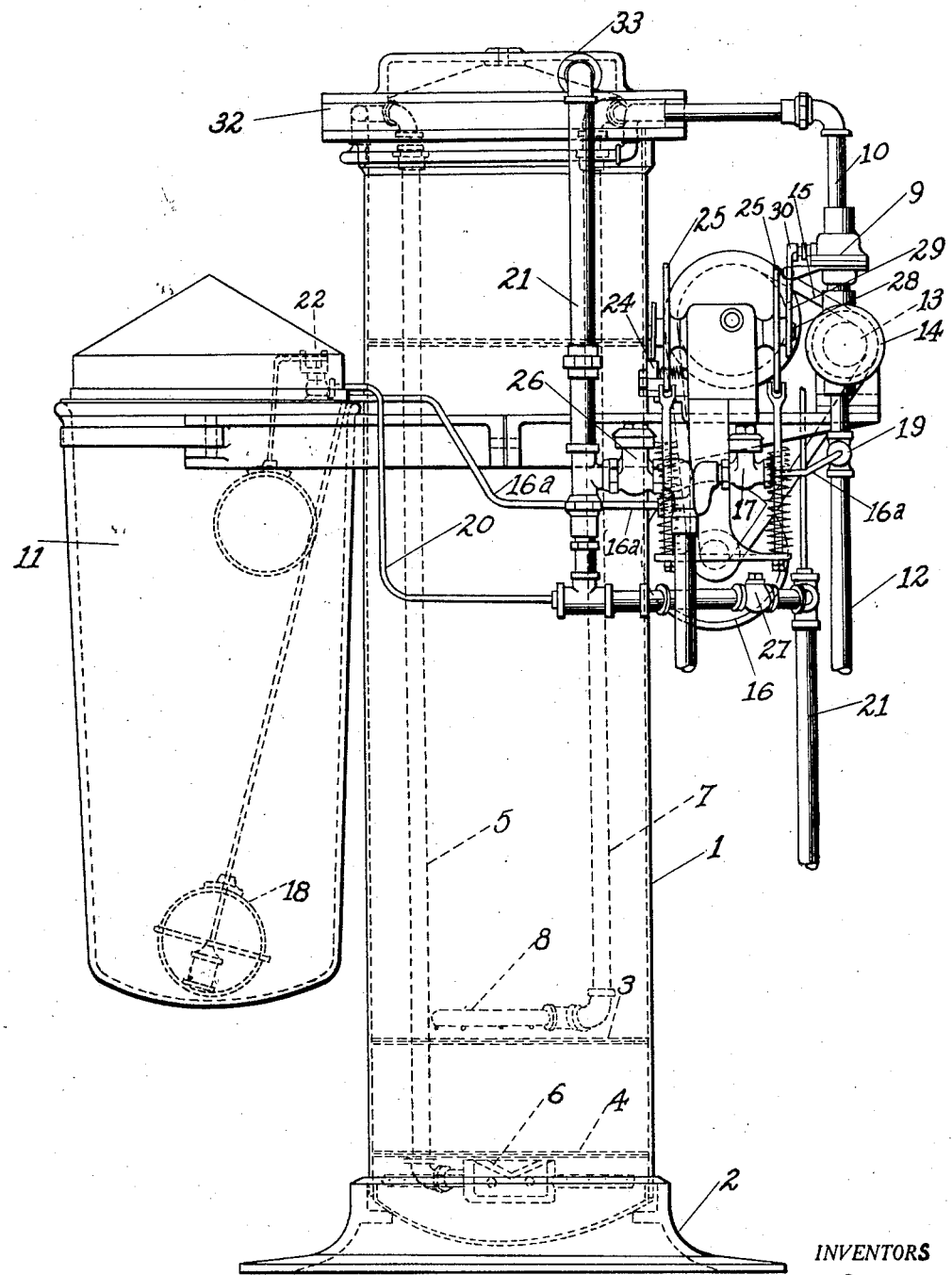

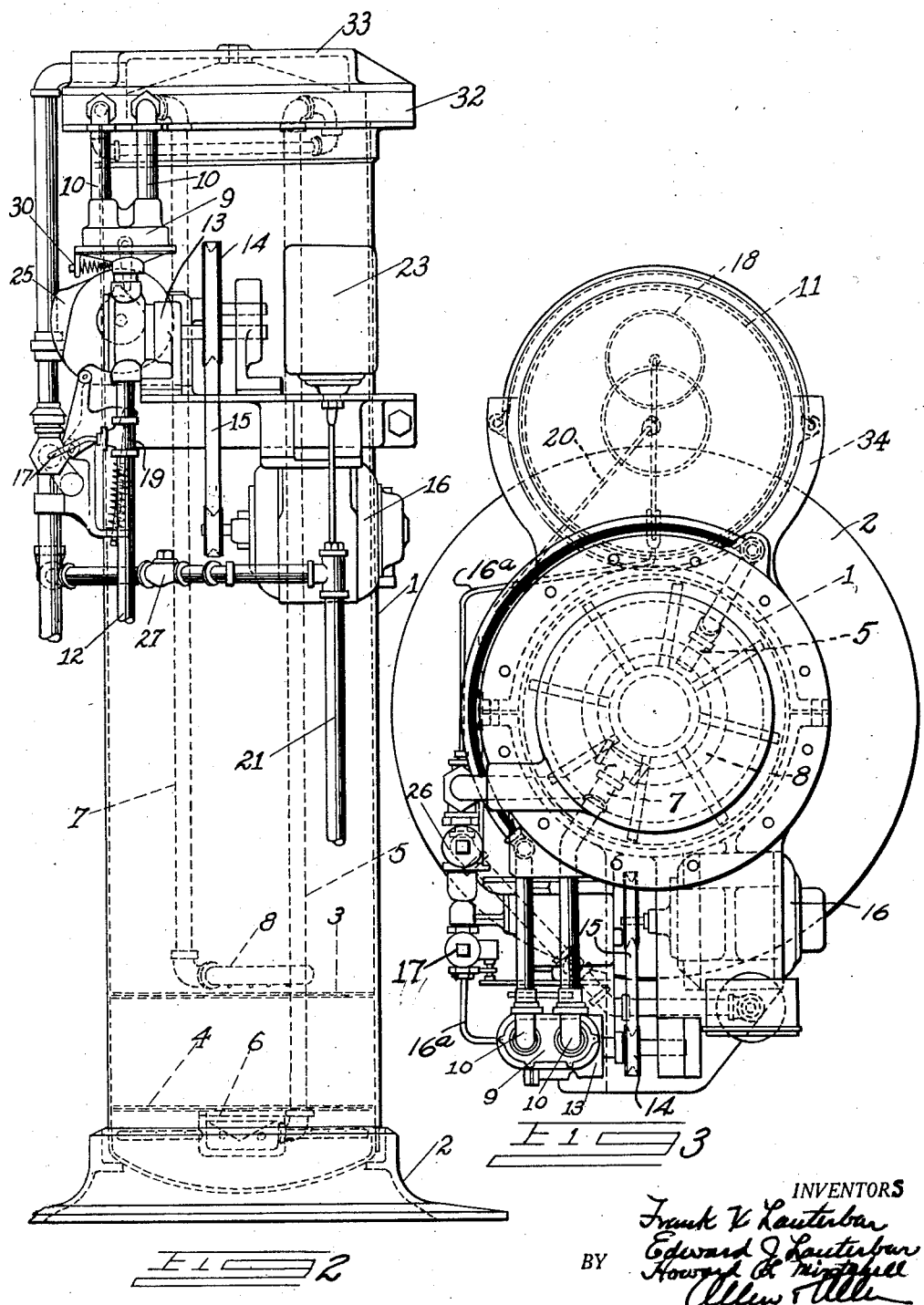

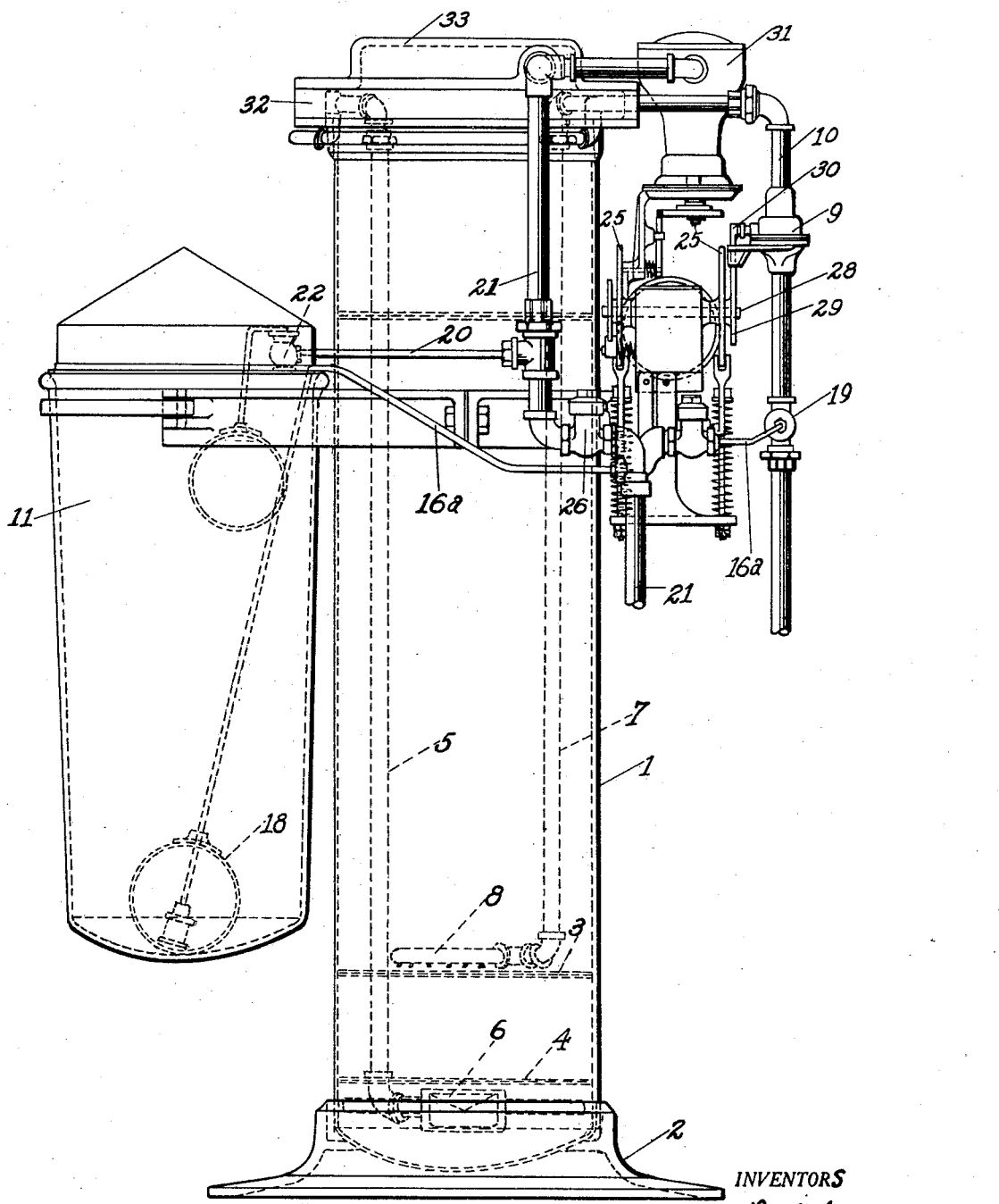

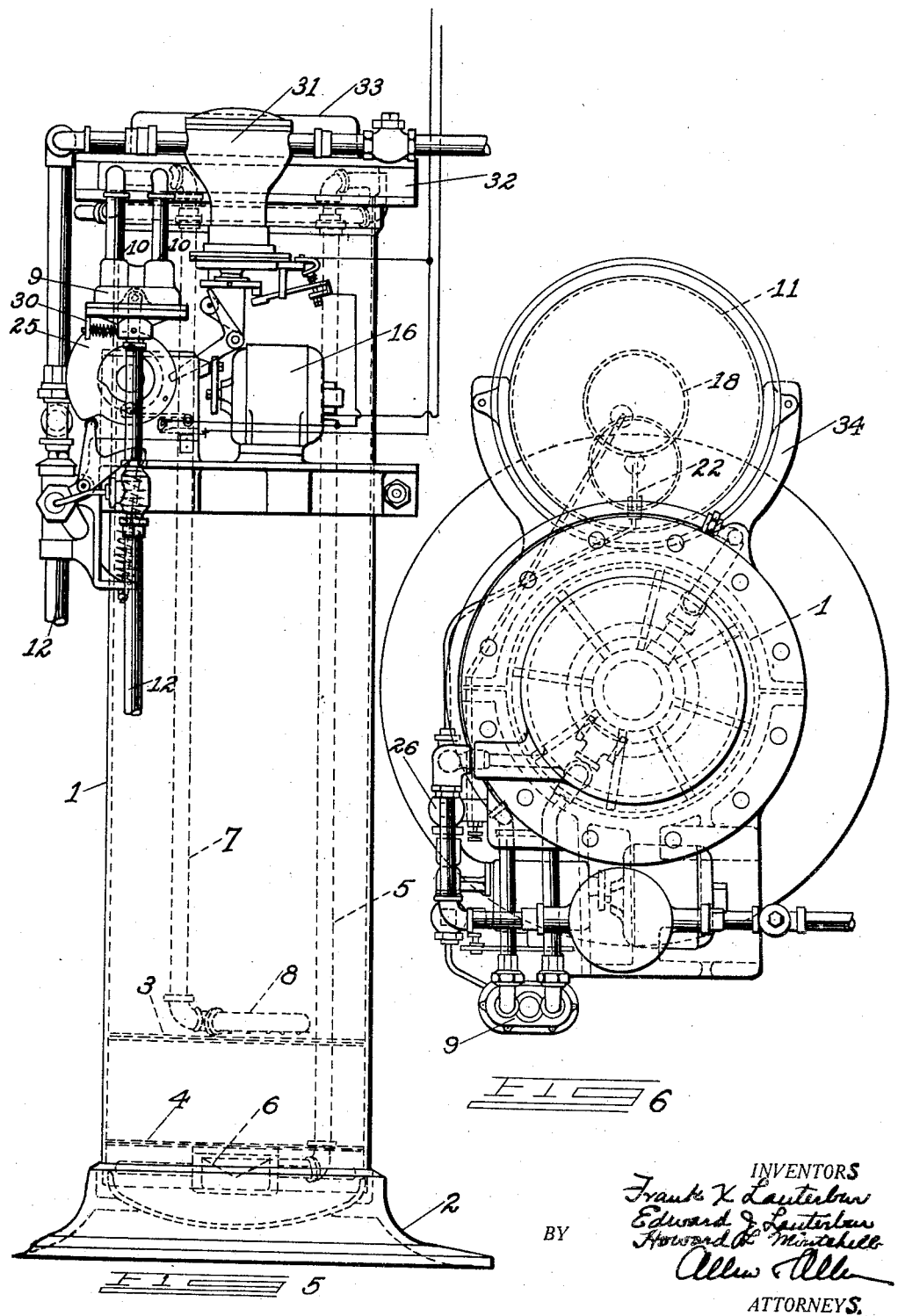

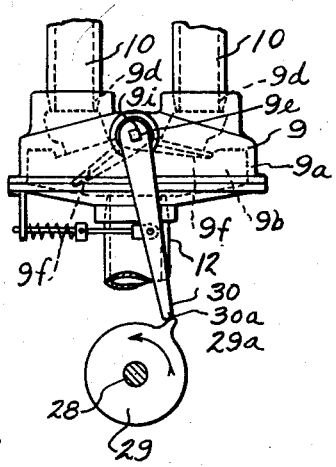
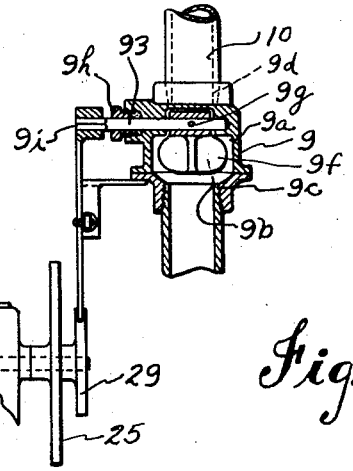
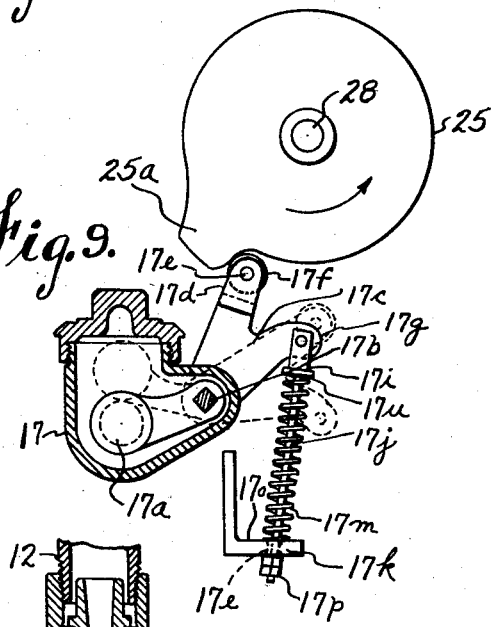
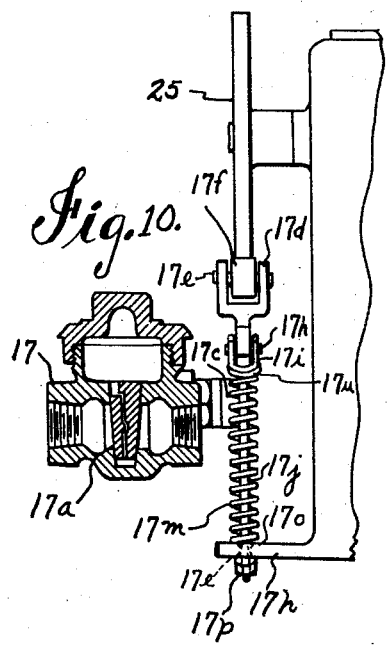
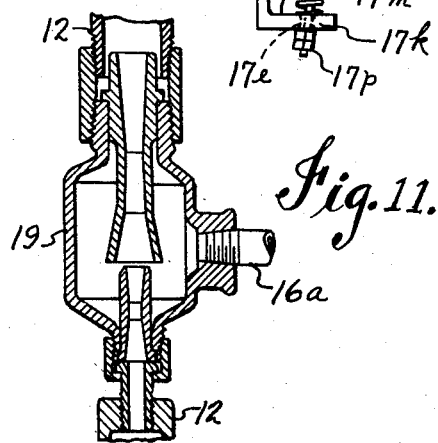

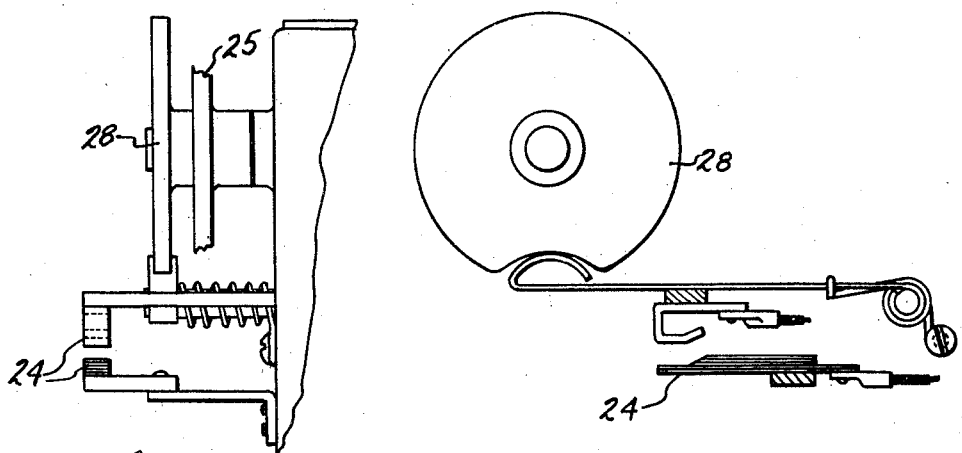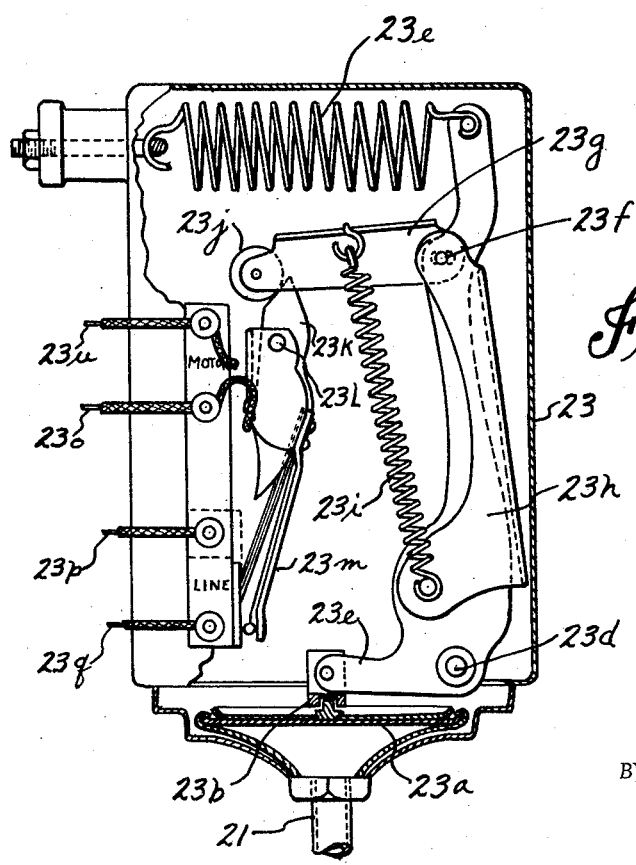

1,885,454

UNITED STATES PATENT OFFICE

FRANK X. LAUTERBUR, EDWARD J. LAUTERBUR, AND HOWARD L. MINTCHELL, OF SIDNEY, OHIO, ASSIGNORS TO THE PEERLESS BREAD MACHINE COMPANY, OF SIDNEY, OHIO, A CORPORATION OF OHIO

WATER SOFTENING APPARATUS AND PROCESS OF SOFTENING WATER

Application filed November 3, 1928. Serial No. 317,004.

Our invention relates to a method and a preferred type of apparatus for directing the flow of water to be softened through a softening tank filled with some softening agent, such as base exchange silicate, without causing channeling.

It is the object of our invention to provide apparatus and a method of directing the flow of water into a softening tank at different levels and in different directions, so that, while the flow of water through certain defined openings might cause channeling, by admitting water at different intervals from different positions the channels caused by one direction of the currents will be changed by a subsequent direction of the currents in different directions, so that there will be constantly changing paths through which the water to be softened will flow.

In the rather complex development of water softening apparatus there have been many different ideas of how to best control the filtering medium so that channeling will be prevented. In our Patent No. 1,804,834, dated May 12, 1931, we have described a water softening system in which a pair of valves, one from a tank containing regenerating material, and another to a drain line, are periodically opened with the operation of a pump which maintains the pressure in a pressure tank within certain pressure limits. It will be our object to explain our preferred method of avoiding channeling in connection with the system described in our patent, and thereby the application of the method and apparatus to other systems can be understood in its broader aspects.

Referring to the drawings:—

Figure 1 is a side elevation of the apparatus in a pump controlled pressure tank system.

Figure 2 is an end elevation of the apparatus shown in Figure 1.

Figure 3 is a plan view of the apparatus shown in Figures 1 and 2.

Figure 4 is a side elevation of the apparatus in a delivery meter control system.

Figure 5 is an end elevation of the apparatus shown in Figure 4.

Figure 6 is a plan view of the apparatus shown in Figures 4 and 5.

Figure 7 is a side elevation of the diverting valve and its operating cam.

Fig. 8 is a side elevation of the cam and the diverting valve shown in section.

Fig. 9 is an end elevation of the cam operating the quick opening valve and the valve in section.

Fig. 10 is a side elevation of the cam operating the quick opening valve and the valve shown in section.

Fig. 11 is a section through the injector.

Fig. 12 is an end elevation of the cam and the switch for operating the motor.

Fig. 13 is a side elevation of the cam and switch for operating the motor.

Fig. 14 is a detailed side elevation of the pressure operated switch.

Referring first to Figures 1 to 3, although similar reference numerals indicate like parts in the two systems, we have shown the softening tank 1 which will be filled with some base exchange silicates or other softening agent. The tank is supported on an enlarged base 2. Within the treatment tank there may be provided a screen 3 covered with gravel, and another spaced screen 4 covered with charcoal. The space between the screens may be filled with charcoal. Above the screen 3 and the gravel covering it the supply of the softening reagent will be disposed. The water flowing into the softening tank may flow in either through a pipe 5 provided at its end with a distributing nozzle 6, the openings through which are preferably directed upwardly, or through a pipe 7 having a spider nozzle 8, the openings through which are preferably directed downwardly. The supply to the pipes 5 and 7 is controlled by means of a diverting valve 9 through branch pipes indicated at 10.

The cycles of softening, regeneration and washing are fully disclosed in our Patent No. 1,804,834 dated May 12, 1931. The tank which holds the regenerating mixture is indicated at 11. Water is introduced from the hard water service pipe 12 from which it passes to the water pump 13 driven by a pulley 14 which is rotated by a belt 15 from the electric motor 16. The small pipe 16a extends from the quick opening valve 17 to the tank 11, and when the valve is opened, the solution, in this instance brine, is drawn from the bottom of the tank through the screen indicated at 18. The valve 17 controls the suction of brine solution to the ejector 19 which is on the suction side of the inlet hard water line. The valve 17 is of a standard swing-gate type having a gate 17a fixed on a rotatable shaft 17b. On the outside of the valve body and fixed to the shaft is a bifurcated lever 17c. One end 17d has a pin 17e for rotatably supporting a roller 17f. The other end 17g has a pin 17h for securing it to a bifurcated end 17i of a spring rod 17j. A bracket 17k is fixed in some convenient location adjacent to the valve and has a hole 17l for slidably retaining the rod. A compression spring 17m is confined between a shoulder 17n on the rod and the top 17o of the bracket. Lock nuts 17p on the end of the rod prevent the spring from pulling the rod out from the hole in the bracket. This valve is opened whenever the high spot 25a on the cam comes in contact with the roller. As soon as the roller comes to the end of the high spot, the spring reacts and forces it into contact with the low spot of the cam. A float controlled supply pipe 20 extends from the pipe 21 through which softened water from the top of the softening tank passes to the house service pressure tank and also the tank 11. The pipe 20 has a valve 22 within the brine tank which automatically opens to admit makeup softened water when the solution within the tank sinks to below a certain level.

There is a pressure switch 23 connected to the top of the pipe 21 leading to the pressure tank (not shown) which is used with this system to automatically close a switch 24 which starts the motor 16 when the pressure falls to a predetermined low limit, and opens to stop the motor and pump when the pressure has reached the full pressure tank working pressure. The switch may be any standard type switch having a diaphragm 23a actuated by means of varying pressure within the pipe 21. In the specific switch shown there is a loose connection 23b between a lever 23c and the diaphragm. The lever is rotatably mounted on a fixed stud 23d. Connected at the upper end of the lever is a compression spring 23e, which is also adjustably connected to the casing of the switch and tends to pull the lever around to the left in Fig. 14. A pin 23f fixed in the lever rotatably supports two arms 23g and 23h which are connected together by another compression spring 23i. The arm 23g is limited to upward movement and the arm 23h is limited to rotation towards the right of Fig. 14 with respect to the lever. At the end 23g a roller 23j is rotatably mounted on a pin that is fixed in the arm.

Another tilting lever 23k is rotatably mounted on a fixed pin 23l. One end is beveled to permit ease of contact with the roller and thereby cause the contacts 23m to close the circuit when decreased pressure allows the diaphragm to flex downward. The lever with its component parts will rotate towards the left and force the contacts into engagement, thereby completing the circuit to the motor. The motor leads are 23n and 23o, and the line leads are 23p and 23q. Through suitable reduction gear mechanism a pair of cams 25 provided with suitable high and low spots are driven. The cams at certain intervals during the operation of the electric motor open first the brine tank pipe valve 17 and at a brief interval thereafter the valve 26 to the drain. A check valve 27 prevents the return flow of water to the drain from the pressure tank.

The intervals during which the softening tank is regenerated and washed do not form any part of the invention described herein as the cycle of operation is explained in our Patent No. 1,804,834, dated May 12, 1931, hereinbefore referred to. Our invention in this case relates to the method and apparatus by which we avoid channeling in the softening tank during the passage and softening of hard water therein.

Mounted on the shaft 28 carrying the cams 25 we have mounted a cam 29 which during the rotation of the shaft at predetermined intervals bears against the diverting valve shifter handle 30 and thus causes water to flow either through the pipe 5 or the pipe 7. The diverting valve may be of any preferred type of three-way valve having a port always open to the inflowing water with ports selectively opened to admit water through either the pipe 5 or the pipe 7. The preferred type of valve 9 is illustrated in Figure 7. It has a main body 9a with an inner chamber 9b connected to the pipe 12 through a threaded opening 9c. At the top of the body there are two other threaded openings 9d for the pipes 10. Centrally located there is a rotatable shaft 9e upon which is fixed valve gates 9f by means of a pin 9g. A packing gland 9h is provided to prevent leakage around the shaft. The shaft has a square end 9i for mounting and fixing the lever 30 thereon. The lever 30 is moved to the left as shown in Fig. 7 when a high point 29a on the cam 29 contacts with its end 30a. Movement of the lever opens one line and closes the other (see Fig. 7).

During the passage of water through the pipe 5, it is directed preferably upwardly from the spray nozzle. After a certain interval the valve port to the pipe 5 is closed through the mechanical connection with the source of power that is driving the pump, and then the hard water is pumped in through the pipe 7 and is preferably directed downwardly through the spider 8. The channels which are formed by water passing into the charcoal bed through the nozzle are thus obstructed, and when the water is again introduced through the nozzle it flows up through the filter bed through new channels. Thus, each diversion of the flow of water obstructs the channels formed by the previous diversion and the alternate diversion of the water prevents any permanent channeling.

Referring now to the system illustrated in Figures 4 to 6, we have shown the pressure tank 1 which will be filled similarly to the tank shown in Figures 1 to 3. A suitable base 2 supports the tank. Within the tank there is a screen 3 covered with gravel and another spaced screen 4 covered with charcoal. The space between the screens may be filled in with charcoal. Above the screen 3 and the gravel covering it the supply of softening reagent will be disposed. The water flowing into the tank may flow in either through a pipe 5 provided at its end with a nozzle 6, or through a pipe 7 provided at its end with a nozzle 8. The opening in the nozzles are preferably so arranged that water will be directed by one nozzle upwardly and by the other downwardly. A diverting valve 9 is shifted as in the first described system to cause water to flow in either through the pipe 5 or the pipe 7.

The cycles of softening, regenerating and washing are regulated in accordance with usual practice. The water passing to the house service passes through a meter 31 which has electric contacts so arranged that after a certain volume of water has passed to the house service a switch is closed which starts in operation an electric motor 16 which is operatively connected with the shaft 27 on which are mounted the cams which during the cycle of operation of the system at predetermined intervals open the brine valve 17 and the drain valve 26 so that the material within the softening tank is subject to the usual regeneration and washing.

The system has connection such as the brine pipe 16a with its suction screen 17 and the ejector 19 on the hard water inlet line. A float control supply pipe 20 extends from the soft water discharge line 21 to the brine tank so that a substantially constant level of liquid may be maintained in this tank.

It will thus be observed that while we have described a slightly different control for the cycle of operations, each system has incorporated in it a method of diverting the flow of water through the softening tank at different levels and with the streams directed differently so that the formation of channels is prevented and the timing of the diverting action is synchronized with the mechanism controlling the regular cycles of operation of the several systems.

In both the systems described it will be noted that the pipes 5 and 7 are supported from a cast ring 32 secured between an upper flange of the tank and the flange of the cap 33. A bracket 34 may also be extended from the ring to support the tank containing the regenerating material. Thus, a compact unit is provided in which no tapped holes into the main softening tank are required.

Having thus described our invention, what we claim as new and desire to secure by Letters Patent, is:—

1. In a water softening apparatus having a tank for water softening material and means for automatically inducing cycles of regeneration therein, means operating to alternately divert the flow of water to be softened to different levels within said tank having a control therefor operatively connected with said first noted means.

2. A water softening tank having a pair of spaced intake pipes in the bottom portion thereof and a discharge in the top portion, and means operating to alternately divert streams of water to be softened through first one and then the other intake pipe.

3. A water softening tank having a pair of spaced intake pipes in the bottom portion thereof and a discharge in the top portion, and means operating to alternately divert streams of water to be softened through first one and then the other intake pipe, said spaced intake pipes each having nozzle attachments with discharge apertures directing the flow of water therefrom in different directions.

4. A water softening tank having a pair of spaced intake pipes in the bottom portion thereof and a discharge in the top portion, and means operating to alternately divert streams of water to be softened through first one and then the other intake pipe, said spaced intake pipes each having nozzle attachments with discharge apertures directing the flow of water therefrom in different directions, and the plane of the direction of the discharging apertures from each nozzle attachment being opposed one to the other.

5. A water softening tank having a discharge at the top thereof and spaced inlet charging pipes extending into the bottom portion thereof, means for supporting said charging pipes independently of said tank, a tank for regenerating material associated with said tank, and said means also supporting said last named tank.

6. The process of introducing water to be softened through a bed of softening media so as to avoid the formation of channels which consists in directing the flow of water to be softened automatically and at alternate intervals into the bed at different levels therein.

7. The process of introducing water to be softened through a bed of softening media so as to avoid the formation of channels which consists in directing the flow of water to be softened automatically and at alternate intervals into the bed at different levels therein and in different directions at the different levels.

FRANK X. LAUTERBUR.
EDWARD J. LAUTERBUR.
HOWARD L. MINTCHELL.